Aug. 28, 1956     C. E. COMPTON     2,760,624
SCREW CONVEYOR AND MANUFACTURE THEREOF
Filed Oct. 17, 1952
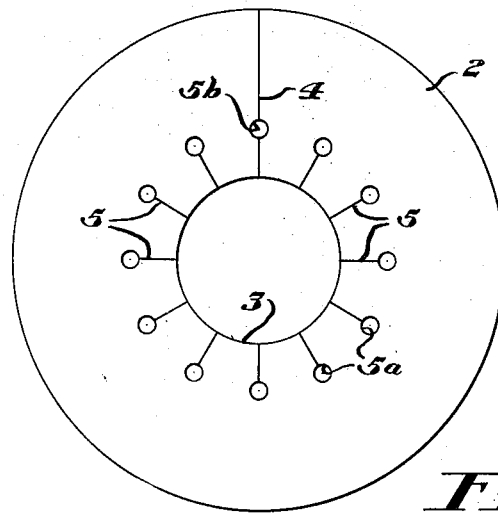
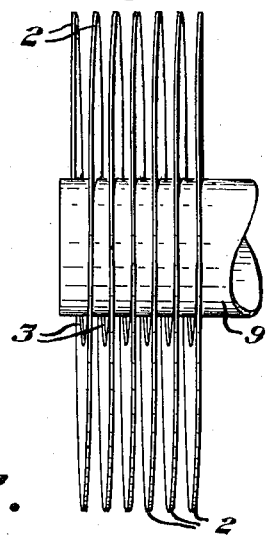
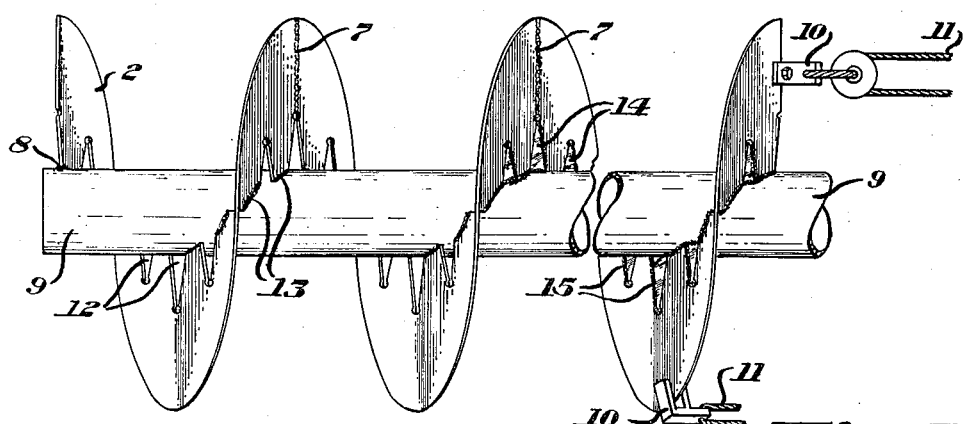
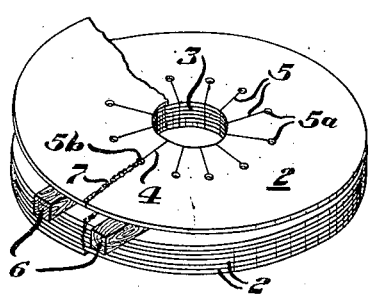
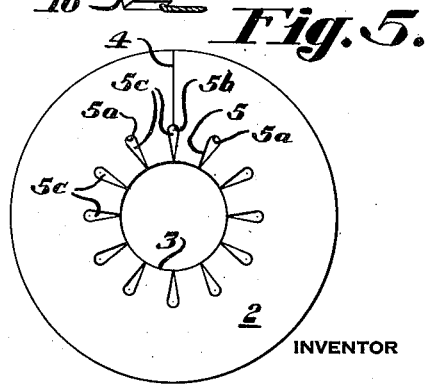
INVENTOR
CHARLES E. COMPTON United States Patent Office 2,760,624
Patented Aug. 28, 1956

2,760,624
SCREW CONVEYOR AND MANUFACTURE THEREOF

Charles E. Compton, Clarksburg, W. Va.

Application October 17, 1952, Serial No. 315,370

3 Claims. (Cl. 198—213)

This invention relates to a screw conveyor and the manufacture thereof. It relates particularly to a screw conveyor of the type employing a helically arranged generally plate-like member which when rotated advances material disposed between its convolutions and the manufacture of such a conveyor.

In my copending application Serial No. 228,397, filed May 26, 1951, are disclosed a conveyor and method of manufacture over which the present invention constitutes an improvement. The conveyor disclosed in my said application is made by providing a disc having a hole through the center thereof, providing a plurality of slits in the disc extending outwardly from the central hole, one of the slits extending completely to the periphery of the disc, other of the slits extending only part way to the periphery of the disc, disposing the disc about a central shaft, separating generally parallel to the axis of the shaft the edges of the slit extending completely to the periphery of the disc and fastening the thus disposed disc to the shaft to form a screw conveyor.

The conveyor of my said application has proved quite satisfactory, as has the method of making it. I have employed the invention of the said application primarily in the making of conveyors of large diameter permitting disposing of the slit disc in generally helical form without imposing undue stress on the metal. However, when conveyors of relatively small diameter are made the metal is severely internally stressed when the discs are disposed in generally helical form and fastened to a central shaft or otherwise maintained in that form. There is a tendency for the metal adjacent the slits to buckle, resulting in somewhat curving or bowing the helical conveyor element and also resulting in uneven curvature of such element. When the conveyor is subjected to stresses as in handling or use such stresses augmented by the internal stresses may cause undesirable further deformation of the helical conveyor element or even failure of such element.

I have discovered how to obviate the difficulties encountered in connection with conveyors of relatively small diameter made according to my said application and the manufacture thereof. I provide for relieving the helical conveyor element of a considerable portion of the stress imparted thereto according to the prior method while at the same time providing for at least as strong a connection between the helical conveyor element and the central shaft and largely eliminating buckling and bowing of the helical element and danger of failure in use. I accomplish the result by laterally enlarging at their outer extremities at least some of the slits which extend only part way to the periphery of the disc. I preferably drill holes through the outer extremities of at least some of the slits which extend only part way to the periphery of the disc.

I may make at least some of the slits which extend only part way to the periphery of the disc wider at their outer ends than at their inner ends. I may make a hole of substantial width generally circumferentially of the disc at the outer extremity of each of at least some of the slits which extend only part way to the periphery of the disc and widen at least some of such slits outwardly of the inner ends thereof by removing material along the edges of the slits to the circumferentially outer ends of the holes and thereby form slits of increasing width radially outwardly of the disc. I preferably do not cut away any of the metal between the slits at the periphery of the central hole in the disc, thereby preserving the full length of a disc edge at the central hole for welding to the shaft. At the same time, however, the internal stresses are largely dissipated, resulting in an unprecedentedly strong conveyor.

Employment of my present invention enables me to make the slits which extend only part way to the periphery of the disc extend less than half way to the periphery instead of at least half way as previously. I prefer to provide such slits extending about a third of the way from the central hole to the periphery of the disc. This in itself considerably strengthens the conveyor apart from the advantages accruing by reason of reduction of internal stresses and elimination of danger of buckling and bowing. Also the die and slitting cost is reduced.

Other details, objects and advantages of the invention will become apparent as the following description of certain present preferred embodiments thereof and certain present preferred methods of practicing the same proceeds.

In the accompanying drawings I have shown certain present preferred embodiments of the invention and have illustrated certain present preferred methods of practicing the same in which:

Figure 1 is a plan view of a slit disc;

Figure 2 is an edge view showing a plurality of discs such as that shown in Figure 1 welded together at portions of the slit edges and disposed about a shaft to which they are to be applied to form a screw conveyor;

Figure 3 illustrates a method of forming a screw conveyor and shows at respective portions thereof two forms which the conveyor may take;

Figure 4 is a perspective view showing how slit discs may be welded together; and Figure 5 is a view similar to Figure 1 showing a modified form of slit disc which may be employed for making a conveyor.

Referring now more particularly to the drawings, there is shown in Figure 1 in plan view a disc 2 which may, for example, be of steel and of suitable dimensions for forming a screw conveyor of desired size and capacity. The invention is especially well adapted for the making of conveyors of up to about three or four feet in diameter, i. e., its advantages are more pronounced when so employed although the invention may be utilized in making conveyors of greater diameter. The thickness of the steel disc 2 should be in proper relation to the diameter of the disc and the work to be performed.

The disc 2 is provided with a circular central hole 3 and with twelve radial slits equally spaced circumferentially of the disc one of which is designated 4 and the other eleven of which are designated 5. The slit 4 extends completely from the central hole 3 to the periphery of the disc. The slits 5 extend only part way from the central hole 3 to the periphery of the disc. The slits 5 in the structure shown extend less than half way from the central hole 3 to the periphery of the disc; I find that optimum results are obtained when the slits extend about a third of the way to the periphery of the disc.

I laterally enlarge at their outer extremities at least some and preferably all of the slits 5. I preferably drill holes 5a through the outer extremities of the slits. A similar enlargement or hole, indicated in the drawings at 5b, is formed intersecting the slit 4 at the same distance from the central hole 3 as the holes 5a. The holes 5a and 5b need not be drilled but may be otherwise formed, as, for example, by punching. Such holes need not be circular but may be of other shape, the most important dimension thereof being the dimension circumferentially of the disc. Since it is more economical to form the holes by drilling, which may be done in a single operation utilizing a gang drill, I normally form them in that manner. The advantages of my invention may be realized to some extent, although not fully, by laterally enlarging or forming holes as above described intersecting less than all of the slits 4 and 5, as, for example, alternate slits.

Although it is possible to form a conveyor utilizing a single disc, since normally a plurality of discs will be utilized I shall describe the making of a conveyor utilizing a plurality of discs. The discs are welded to one another along portions of the edges formed by the slits 4 as designated at 7. The welding may be accomplished by laying a disc upon a surface and raising one of the edges formed by the slit 4 and positioning one edge of another disc opposite the raised edge and welding the two edges together, preferably along only part of the opposed edges so that a slit of the same length as the slits 5 with an enlarged outer extremity will be left. Figure 4 shows how the opposed edges may conveniently be supported in position for welding by positioning bars or sticks of wood 6 so as to raise the unwelded edge of a lower disc and support an edge of an upper disc in proper relation thereto. The weld may be formed by any appropriate method of welding. In the drawings each of the welds 7 is shown as extending inwardly from the periphery of the disc to the outer edge of the hole 5b which intersects the slit 4, thus leaving an unwelded slit in line with the weld which is of approximately the same radial extent as the slits 5 as above mentioned.

When the desired number of discs have been welded together in the manner above described to form a helix they are disposed over a shaft as indicated more or less diagrammatically in Figure 2. The diameter of the shaft is less than the diameter of the hole in the helix before the helix is pulled out as pulling out of the helix results in decrease of the diameter of the hole therein. One end of the helix is tack-welded to the shaft as indicated at 8 in Figure 3. The other end of the helix is engaged by any suitable means for pulling out the helix along the shaft. The shaft is designated 9 and the means for pulling out the helix along the shaft is shown as comprising a pair of elements 10 of any suitable form to engage the helix and means 11 for pulling the elements 10 generally axially of the shaft 9. Conventional block and tackle apparatus or any of the suitable pulling means may be employed. The shaft 9 may be solid or hollow, being shown in the drawings as hollow and being constituted by a length of steel pipe.

Pulling out of the helix is facilitated by the above described slits and especially by the holes 5a and 5b. As the helix is pulled out the slits open up forming openings 12 between their opposed edges. The provision of the holes 5a and 5b inhibits the tendency otherwise existing for the metal of the helix to buckle or bow and the helix is relatively free from internal stresses. Thus its strength and life are materially increased. It is adapted to withstand external stresses which it might not withstand but for the provision of the holes 5a and 5b.

The helix may be pulled out to its full length at one time. The holes 3 in the discs are made of such diameter in relation to the diameter of the shaft 9 that when the helix is pulled out to the desired pitch it will embrace the shaft. I preserve the full length of the edge at the periphery of the central hole 3 of each disc for welding to the shaft. The helix is preferably welded to the shaft as indicated at 13 along the full length of each inner edge between slits. The generally radial elements of the helix are substantially perpendicular to the axis of the shaft. The helix is substantially free from bowing and the consequent heavy internal stress.

The slits may be left open in the finished conveyor as shown at the left hand portion of Figure 3 or they may be closed by applying closure means thereto as shown at the right hand portion of Figure 3. The closure means are designated by reference numeral 14 and as shown are in the form of appropriately shaped steel plates welded to the edges of the open slits as shown at 15. The closure means 14 when employed lie generally in planes normal to the original planes of the discs and also generally in planes containing the axis of the shaft 9.

Figure 5 shows a modified structure in which the slits 5 and the similar slit radially inwardly of the portion of the slit 4 which is to be welded are made wider at their outer ends than at their inner ends. This is done by removing material along the edges of the slits to the circumferentially outer ends of the holes 5a and 5b. The slits thus formed are of wedge shape with rounded outer ends. Such slits further increase the stress relieving action of the holes 5a and 5b, discs as shown in Figure 5 affording optimum characteristics in the finished conveyor. In the finished conveyor the slits may be left open or closed by closure means analogous to the closure means 14. The full length of the circumference of the central hole 3 is still preserved for welding to the shaft even in the form of disc shown in Figure 5. After the holes 5a and 5b are drilled generally wedge shaped elements 5c may be cut out, or the entire operation of forming the tapered slits with rounded ends may be performed by a single die in a single operation.

The term "disc" as used herein includes not only a complete disc but also a sector of a disc, as my results would be obtainable by the use of sectors in the same manner as above described for use of complete discs.

While I have shown and described certain present preferred embodiments of the invention and have illustrated certain present preferred methods of practicing the same it is to be distinctly understood that the invention is not limited thereto but may be otherwise variously embodied and practiced within the scope of the following claims.

I claim:

1. A screw conveyor of the order of three or four feet in diameter comprising a shaft and a generally helical conveying element disposed about the shaft, the generally helical conveying element having a hole through the center thereof through which the shaft passes and convolutions which lie in generally side-by-side relationship in a direction parallel to the axis of the shaft, the generally helical conveying element being welded to the shaft with the convolutions of the generally helical conveying element separated in a direction parallel to the axis of the shaft, the generally helical conveying element being slitted at intervals from the hole therein outwardly less than half way to the periphery thereof, the outer extremities of at least some of the slits being laterally enlarged, the generally helical conveying element being substantially free from bowing and having at its inner portion generally radial portions defined by the slits respectively disposed substantially perpendicular to the axis of the shaft.

2. A screw conveyor of the order of three or four feet in diameter comprising a shaft and a generally helical conveying element disposed about the shaft, the generally helical conveying element having a hole through the center thereof through which the shaft passes and convolutions which lie in generally side-by-side relationship in a direction parallel to the axis of the shaft, the generally helical conveying element being welded to the shaft with the convolutions of the generally helical conveying element separated in a direction parallel to the axis of the shaft, the generally helical conveying element being slitted at intervals from the hole therein outwardly less than half way to the periphery thereof, the generally helical conveying element having holes therethrough adjacent the outer extremities of at least some of the slits, the generally helical conveying element being substantially free from bowing and having at its inner portion generally radial portions defined by the slits respectively disposed substantially perpendicular to the axis of the shaft.

3. A screw conveyor of the order of three or four feet in diameter comprising a shaft and a generally helical conveying element disposed about the shaft, the generally helical conveying element having a hole through the center thereof through which the shaft passes and convolutions which lie in generally side-by-side relationship in a direction parallel to the axis of the shaft, the generally helical conveying element being welded to the shaft with the convolutions of the generally helical conveying element separated in a direction parallel to the axis of the shaft, the generally helical conveying element being slitted at intervals from the hole therein outwardly less than half way to the periphery thereof, the width of at least some of the slits increasing progressively outwardly along at least a portion thereof, the generally helical conveying element being substantially free from bowing and having at its inner portion generally radial portions defined by the slits respectively disposed substantially perpendicular to the axis of the shaft.

References Cited in the file of this patent

UNITED STATES PATENTS

| | | |
|---|---|---|
| 1,217,537 | Turney | Feb. 27, 1917 |
| 1,422,972 | Henry | July 18, 1922 |
| 1,738,994 | Gredell | Dec. 10, 1929 |
| 2,018,085 | Otte | Oct. 22, 1935 |
| 2,046,988 | Winter | July 7, 1936 |
| 2,251,074 | Sibley | July 29, 1941 |

FOREIGN PATENTS

| | | |
|---|---|---|
| 392,346 | Germany | Mar. 24, 1924 |